United States Patent
Zolper et al.

(10) Patent No.: US 10,765,102 B2
(45) Date of Patent: Sep. 8, 2020

(54) VARIABLE VOLUME FLOW INJECTION NOZZLE

(71) Applicant: WiSys Technology Foundation, Inc., Madison, WI (US)

(72) Inventors: Thomas J. Zolper, Cuba City, WI (US); James A. Luoma, La Crescent, MN (US); Corey A. Flores, Neenah, WI (US)

(*) Notice: Subject to any disclaimer, the term of this patent is extended or adjusted under 35 U.S.C. 154(b) by 220 days.

(21) Appl. No.: 16/043,443

(22) Filed: Jul. 24, 2018

(65) Prior Publication Data

US 2019/0021302 A1    Jan. 24, 2019

Related U.S. Application Data (60) Provisional application No. 62/536,164, filed on Jul. 24, 2017.

(51) Int. Cl.
*A01M 7/00* (2006.01)
*A01N 63/00* (2020.01)

(52) U.S. Cl.
CPC .......... *A01M 7/0032* (2013.01); *A01M 7/005* (2013.01); *A01N 63/00* (2013.01); *A01M 2200/00* (2013.01)

(58) Field of Classification Search
CPC ................ A01M 7/0032; A01M 7/005; A01M 2200/00; B05B 9/06; A01N 63/00
USPC ........................................................ 239/743
See application file for complete search history.

(56) References Cited

U.S. PATENT DOCUMENTS

| | | | | |
|---|---|---|---|---|
| 3,498,264 A * | 3/1970 | Hooper | ................. | A01M 19/00 119/235 |
| 4,882,072 A * | 11/1989 | Eberhardt | ................. | C02F 1/66 210/252 |
| 5,089,120 A * | 2/1992 | Eberhardt | ................. | C02F 1/66 114/124 |
| 5,878,926 A * | 3/1999 | Schmidt | .............. | A01M 1/2044 239/722 |
| 6,269,763 B1 * | 8/2001 | Woodland | .............. | A62C 29/00 114/144 A |
| 6,604,697 B1 * | 8/2003 | Heren | .................... | A01G 25/09 239/722 |
| 9,180,939 B2 * | 11/2015 | Barr | ........................ | B63B 35/00 |
| 10,118,138 B2 * | 11/2018 | Tews | ..................... | B01F 5/0225 |
| 2003/0132311 A1 * | 7/2003 | Dorendorf | ............ | B05B 7/1281 239/302 |
| 2003/0167993 A1 * | 9/2003 | Husain | ..................... | B63J 4/002 114/74 R |

(Continued)

FOREIGN PATENT DOCUMENTS

CA    2693699 A1 *    8/2010    ............ A01M 7/005

*Primary Examiner* — Christopher P Ellis
(74) *Attorney, Agent, or Firm* — Boyle Fredrickson S.C.

(57) ABSTRACT

The present invention provides a molluscicide application apparatus and process that disperses the molluscicide below the water's surface in a manner that minimizes air entrainment and ensures that the molluscicide solution settles at the targeted floor of the body of water, such as a river or lake bed where driessenid mussels are concentrated, and do not rise to the water's surface or disperse. The present invention also maintains a desired viscosity level, for example, 180 centistokes, at typical freshwater temperatures varying from 15° C. to 25° C. by adjusting the flow rate and/or nozzle orifice area of the molluscicide application.

19 Claims, 4 Drawing Sheets

(56) References Cited

U.S. PATENT DOCUMENTS

| | | | |
|---|---|---|---|
| 2004/0030468 A1* | 2/2004 | Britton | A01M 7/0089 |
| | | | 701/21 |
| 2010/0018586 A1* | 1/2010 | McNabb | B63B 35/305 |
| | | | 137/236.1 |
| 2011/0079559 A1* | 4/2011 | Miller | A01N 59/06 |
| | | | 210/745 |
| 2013/0140376 A1* | 6/2013 | Ballu | A01M 7/005 |
| | | | 239/147 |
| 2013/0146678 A1* | 6/2013 | Johnson | B05B 7/0075 |
| | | | 239/8 |
| 2015/0096768 A1* | 4/2015 | DuBrucq | A62C 99/0018 |
| | | | 169/46 |
| 2016/0221032 A1* | 8/2016 | Whiting | B05B 5/1691 |
| 2017/0114922 A1* | 4/2017 | Kroes | B05B 12/088 |

* cited by examiner

VARIABLE VOLUME FLOW INJECTION NOZZLE

CROSS REFERENCE TO RELATED APPLICATION

This application claims the benefit of U.S. provisional application No. 62/536,164 filed Jul. 24, 2017, hereby incorporated by reference.

STATEMENT REGARDING FEDERALLY SPONSORED RESEARCH OR DEVELOPMENT

BACKGROUND OF THE INVENTION

The present invention relates to the application of molluscicide to the bottom of freshwater lakes and riverbeds in order to control aquatic invasive species of mussels.

Some of the most widespread and detrimental aquatic invasive animals in the United States are the zebra and *quagga* mussels (Dreissenid species). Dreissenid mussels have byssal threads that allow them to attach to hard substrates including man-made structures, rocks, plants, and native mussels. Dreissenid mussels are highly-prolific and extremely efficient filter feeders that redistribute energy within aquatic systems. Invasion of dreissenids into native systems has been linked to extirpation of native mussels, alteration of fish communities and noxious algae blooms. Dreissenid mussels not only disrupt ecosystems, they also cause damage to infrastructure in harbors and waterways, ships and boats, and they foul the water conveyance systems within water treatment and power plants. Industry spends millions of dollars annually to mitigate the impacts of Dreissenid mussels.

There is a desire to control the Dreissenid mussels. One method of controlling Dreissenid mussels is using a molluscicide that will kill the Dreissenids but not endanger humans, damage equipment, or be harmful to other aquatic organisms. One commercially available molluscicide is sold under the tradename Zequanox by Marrone Bio Innovations. When ingested, the molluscicide degrades the mussels digestive systems resulting in death.

Successful application of this molluscicide in open-water environment may require the dispersal of a homogenous mixture of the molluscicide to the bottom of the water column to maintain a high active ingredient concentration over an extended period of time in order for the molluscicide to remain lethal to the Dreissennids (e.g. 100 mg/L for 8 hours).

SUMMARY OF THE INVENTION

The present invention provides a molluscicide application apparatus and process that disperses the molluscicide below the water's surface in a manner that minimizes air entrainment and ensures that the molluscicide solution settles at the bottom of the water column, such as a lake bed where mussels are concentrated, and does not rise to the water's surface or rapidly disperse.

The present invention also maintains a desired viscosity level of molluscicide solution, for example, 180 centistokes, at typical freshwater temperatures varying from 15° C. to 25° C. by adjusting the flow rate and/or nozzle orifice area of the molluscicide application.

In one embodiment, the present invention provides an invasive species toxin application system having a boat including a propulsion system for moving the boat along the surface of a body of water in a propulsion direction as directed by a steering wheel; a tank supported by the boat for holding a toxin; a nozzle extending laterally across the propulsion direction; nozzle supports extending downward from the boat to hold the nozzle beneath the surface of the body of water at a predetermined distance; and a pump for delivering the toxin from the tank to the nozzle at a predetermined delivery rate; where the nozzle provides at least one laterally extending opening presenting a variable fluid flow resistance as a function of lateral distance to promote uniform flow rate as a function of lateral distance.

It is thus a feature of at least one embodiment of the present invention to provide a uniform delivery of molluscicide mixture volume to a bottom of a body of water and uniform height treatment area.

The laterally extending opening may be a set of discrete holes of varying area. The set of discrete holes may increase in area as the holes move away from a nozzle inlet.

It is thus a feature of at least one embodiment of the present invention to vary the area of the opening along a length of the nozzle as one moves away from the nozzle inlet therefore adjusting for the asymmetry of flow along the nozzle as the mixture flows away from the inlets.

The nozzle may extend by a lateral distance at least one half of a width of the boat measured perpendicularly to the propulsion direction. The nozzle may extend a bilateral distance greater than the width of the boat.

It is thus a feature of at least one embodiment of the present invention to deliver the molluscicide mixture to a large treatment area at the bottom of the body of water where the placement of the treated area may be approximated by the width of the boat.

The nozzle may be positioned beneath the surface of the water by at least four feet. The nozzle may be positioned beneath the surface of the water by at least three feet.

It is thus a feature of at least one embodiment of the present invention to deliver the molluscicide mixture close to the bottom of the river or lake to minimize dispersal of the mixture from the lake or river bed.

The nozzle may provide a laterally extending tube connected by a T fitting to a vertically extending toxin delivery pipe communicating with the pump.

It is thus a feature of at least one embodiment of the present invention to reduce the amount of tubing needed to cut through the water to feed to nozzle.

The opening may be positioned to face rearward with respect to the propulsion direction.

It is thus a feature of at least one embodiment of the present invention to create a net zero velocity between the velocity of the boat and the velocity of the molluscicide mixture reducing turbulence when the molluscicide mixture exits the nozzle.

The nozzle may have a drag coefficient less than or equal to a drag coefficient of a circle. The tube may have a circular cross-section.

It is thus a feature of at least one embodiment of the present invention to reduce drag and turbulence of the tubing when cutting through the water.

A height control mechanism may support the nozzle and may be adjustable to position the nozzle beneath the surface of the water at varying depths. The nozzle may provide a laterally extending tube connected to a vertically extending toxin delivery pipe communicating with the pump where the vertically extending toxin delivery pipe is a flexible hose. The height control mechanism may be at least two laterally offset supports extendable below the surface of the water and supporting opposite ends of the nozzle and mechanically linked to move in unison.

It is thus a feature of at least one embodiment of the present invention to accommodate delivery of molluscicide mixture to the bottom of lakes and rivers of varying depths and to adjust the height of the nozzle during delivery.

An area of the laterally extending opening may be adjustable. The laterally extending opening may be a rectangular shutter providing adjustability of area with opening or closing of the shutter with a relationship of direct proportionality between area and an amount of opening or closing of the shutter.

It is thus a feature of at least one embodiment of the present invention to change the orifice area proportionately with volume flow rate to allow an exit velocity to remain constant regardless of water temperature.

A flow rate sensor may provide a flow rate of the toxin exiting the nozzle. A control system may control a flow rate of the toxin to be substantially equal to a speed of the boat.

In an alternative embodiment, the present invention provides a method of delivering invasive species toxin to a body of water, the method comprising using a low air entrainment mixer to mix a wettable solid with water without substantial entrainment of air to produce a toxic slurry; delivering the toxin mixed by the low air entrainment mixture to a tank of a boat including a propulsion system for moving the boat along the surface of a body of water in a propulsion direction as directed by a steering wheel; moving the boat along the surface of the body of water in the propulsion direction to a location of an invasive species; and pumping the toxin from the tank to a nozzle extending laterally across the propulsion direction at a predetermined delivery rate, the nozzle supported by nozzle supports extending downward from the boat to hold the nozzle beneath the surface of the body of water at a predetermined distance. The nozzle provides at least one laterally extending opening presenting a variable fluid flow resistance as a function of lateral distance to promote uniform flow rate as a function of lateral distance.

It is thus a feature of at least one embodiment of the present invention to utilize on-shore mixing of the molluscicide mixture using a high powered generator and then further delivery to an application boat to quickly transport the molluscicide mixture to the target site.

The method may further comprise chilling the toxin prior to delivering the toxin through the nozzle.

It is thus a feature of at least one embodiment of the present invention to allow the molluscicide mixture to sink to the bottom of the lake or river and remain there for an extended period of time without dispersing.

These particular objects and advantages may apply to only some embodiments falling within the claims and thus do not define the scope of the invention.

DETAILED DESCRIPTION OF THE PREFERRED EMBODIMENT

Figure 1:
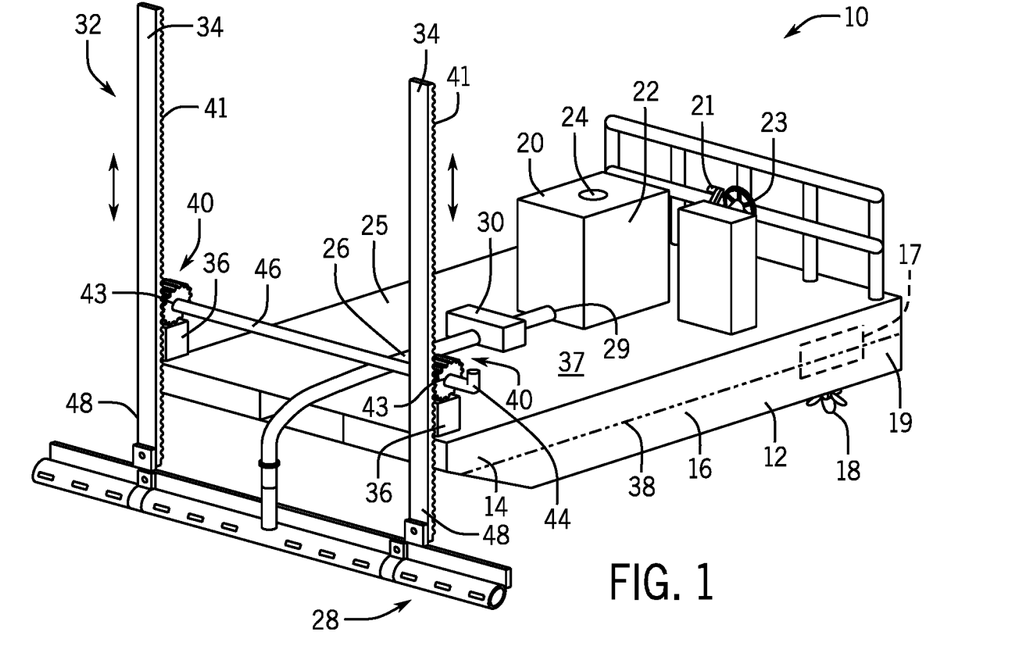
FIG. 1 is a perspective view of an application vessel carrying the molluscicide mixture to be delivered below the water surface and supporting an application nozzle in accordance with one embodiment of the present invention.

Referring to FIG. 1 a molluscicide application system 10 includes an application water vessel such as an application barge 12 comprising of a substantially flat bottomed boat used to transport molluscicide mixture to a target site.

It may be desired that the barge 12 have a hull 16 that is shaped to minimize the turbulence of the barge 12 during movement of the boat through the water so that the molluscicide mixture delivered from the barge 12 is not stirred. A forward part or bow 14 of the hull 16 of the barge 12 may be narrowed along a vertical axis compared to a middle of the barge 12 to provide a narrowed contact surface to the water minimizing the friction of the water on the hull 16 as the water flows from the bow 14 to the rearward part or stern 19 of the hull 16 of the barge 12. It is understood that the hull 16 of the barge 12 may be shaped to be hydrodynamic and therefore to reduce the amount of friction and turbulence on the barge 12 as understood in the art.

The barge 12 may be self-propelled by a propulsion system having an engine 17 rotating a propeller 18, or alternatively, may be towed or pushed by a tow boat (not shown) having its own engine and propeller but separated from the barge 12 by a distance along the water further minimizing the turbulence of the barge 12. It is understood that the barge 12 may be driven by a wheel 23 steering the barge 12 and may include a throttle 21 to regulate the speed of the barge 12 when self-propelled. The barge 12 may be moved in the water in a propulsion direction (when not turning) by the propulsion system as understood in the art, for example, as described in U.S. Pat. No. 1,484,109 and U.S. Pat. No. 1,621,625, hereby incorporated by reference.

A deck 25 of the barge 12 may have a working area of about 8 ft by 18 ft allowing for the loading and support of various molluscicide application system 10 equipment as describe below, and may include a 2 ton barge weight limit to support the weight of such equipment.

The deck 25 may support a molluscicide storage tank 20 carrying a premixed molluscicide mixture 22 (mixed on shore as further discussed below) stored within the substantially rectangular fluid container. The storage tank 20 may include a port 24 positioned in a ceiling or proximate an upper end of the tank walls allowing the premixed molluscicide mixture 22 to be injected into the storage tank 20.

A flexible, suction hose 26 may be used to transport the premixed molluscicide mixture 22 from the storage tank 20, through a port outlet 29 proximate a lower end of tank walls, to the nozzle array 28 for application to the target area. A trash pump 30 may be in-line with the suction hose 26 to pump the premixed molluscicide mixture 22 from the storage tank 20 to the nozzle array 28. The trash pump 30 may be able to pump large volumes of water while also being able to handle any solids, such as debris or clumps of molluscicide powder, within the mixture. The trash pump 30 and suction hose 26 may include in-line control valves and flowmeters, to be discussed further below, in order to control a flow rate of the premixed molluscicide mixture 22 to the nozzle array 28.

The nozzle array 28 may be supported by a nozzle support frame 32 comprising of a pair of laterally spaced vertical support racks 34 positioned at opposed forward corners of the bow 14 of the hull 16. It is understood that the vertical support racks 34 may also be installed at the stern 19 of the hull 16 or along the left and right sides of the hull 16. The vertical support racks 34 may be any number of racks.

Figure 2:
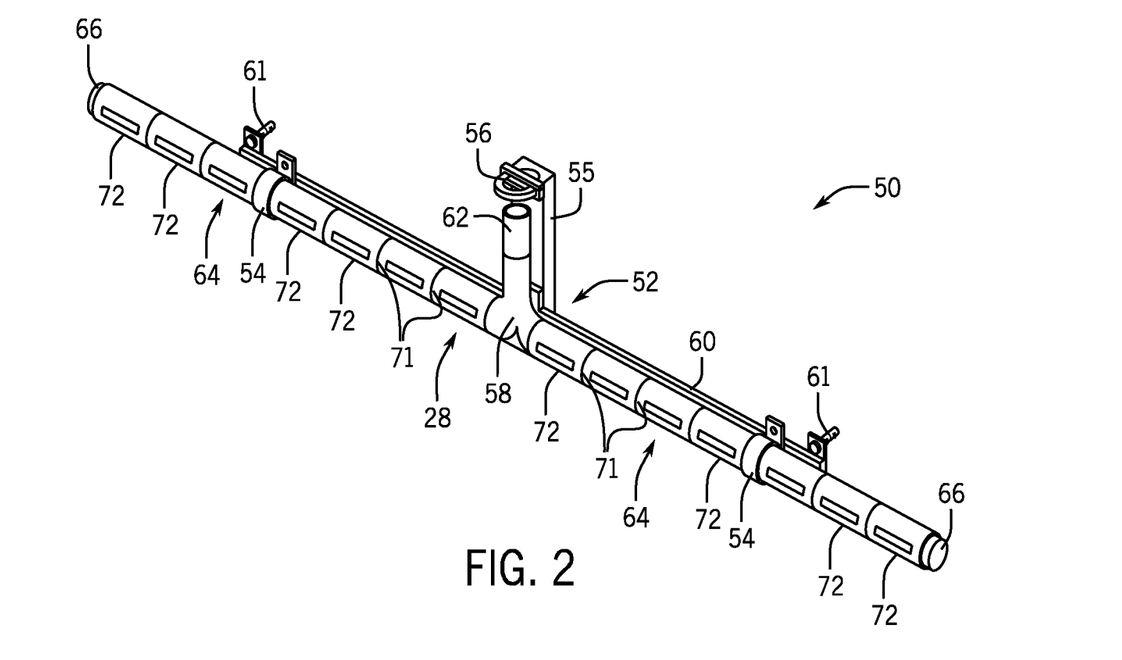
FIG. 2 is a perspective view of the application nozzle of FIG. 1 removed from the application supports.

The vertical support racks 34 may be supported on the barge 12 by rack stands 36 that rest upon an upper surface 37 of the deck 25 of the barge 12 and are secured to the upper surface 37 to prevent movement. A bottom end 48 of the vertical support racks 34 may support a nozzle assembly 50 as shown in FIG. 2 and further discussed below.

The vertical support racks 34 may be adjusted vertically upward and downward with respect to the rack stands 36 so that the nozzle array 28 may be raised or lowered below a surface of the water 38 of the barge 12 to a proper depth for molluscicide application close to the river or lake bed and depending on the depth of the water. For example, the nozzle array 28 may be lowered to a depth of at least 3 ft, at least 4 ft, or between 5 ft to 45 ft below the surface of the water 38. It is understood that the nozzle array 28 is close to the river or lake bed but not touching the river or lake bed so that the premixed molluscicide mixture 22 is delivered close to the target site without having to drop through the water a far distance. The vertical support racks 34 may be marked along their lengths so that the depth of the nozzle array 28 may be visually determined.

The vertical support racks 34 may be adjusted with respect to the rack stands 36 by manually operating winches 40 mounted to the top of the rack stands 36. The winches 40 include hand cranks 44 rotatably mounted about an axle of a pinion or circular gear 43, the circular gear 43 engaging teeth of a rack or linear gear bar 41 extending along the vertical support racks 34 to move the vertical support racks 34 upward and downward with respect to the rack stands 36 by rotational motion of the hand crank 44. It is understood that the winches 40 may also be other types of linear actuators such as pawl and ratchet systems and the like, and may further include a brake system.

A cross bar 46 may extend between the circular gears 43 of the hand winches 40 of the rack stands 36 such that a single hand crank 44 of one of the hand winches 40 may be used to raise and lower the vertical support racks 34 together at the same time and at a same height.

The nozzle support frame 32 may be constructed of carbon steel and may additionally be painted to prevent corrosion when exposed to water or the natural elements. It is also understood that the nozzle support frame 32 may include any type of height control mechanism allowing for height to control of the nozzle assembly 50, for example, a crane capable of being lowered into the water.

Referring to FIG. 2, the nozzle assembly 50 may include a horizontally extending nozzle array 28 including a plurality of nozzle segments 72 receiving the premixed molluscicide mixture 22 from the suction hose 26 and supported by a nozzle support 52 extending between the vertical support racks 34 at the bottom end 48 of the vertical support racks 34 and including clamps 54 to attach the nozzle array 28 to the nozzle support 52.

The nozzle support 52 may include a vertically extending support bar 55 carrying a ring clamp 56 extending radially about a vertical axis and receiving and securing the suction hose 26, and therefore, facilitating connection of the suction hose 26 to the nozzle array 28.

The nozzle support 52 further includes a horizontally extending crossbar 60 attached to a bottom end of the vertically extending support bar 55 extending between the bottom end 48 of the vertical support racks 34 and fastened to the vertical support racks 34 with fasteners 61 to help stabilize the nozzle array 28 between the vertical support racks 34. The crossbar 60 may include one or more ring clamps 54 extending radially about a horizontal axis and coupling the nozzle array 28 to the crossbar 60.

The crossbar 60 may be substantially aligned behind the nozzle array 28 to minimize the amount of drag caused by water hitting the crossbar 60 and nozzle array 28 when the nozzle assembly 50 moves through the water. It is understood that the nozzle array 28 may be installed in front of or behind the crossbar 60 depending on the position of the nozzle assembly 50 on the barge 12 and the propulsion direction of the barge 12. The crossbar 60 may have an outer dimension that is less than an outer dimension of the nozzle array 28 so that the crossbar 60 is protected behind the nozzle array 28.

Referring also to FIG. 3, the suction hose 26 may be easily connected to a cam and groove fitting 62 of a T connector 58 connecting the vertically extending suction hose 26 to the horizontally extending nozzle array 28. The T connector 58 may comprise of a vertical section branching into two opposed horizontal sections extending in opposed lateral directions toward opposite vertical support racks 34. The T connector 58 attaches to the plurality of horizontally extending nozzle segments 72 defining the nozzle array 28 and extending between the vertical support racks 34.

The nozzle array 28 may include left and right lateral pipe sections 64 attached to the T connector 58 proximate a lateral midpoint of the nozzle array 28. The outer ends 66 of the pipe sections 64 may be closed or capped to prevent exit. A length of the nozzle array 28 may be greater than a distance between the vertical support racks 34 such that the outer ends 66 of the pipe sections 64 extend outwardly past the vertical support racks 34. The nozzle array 28 may be at least one half of a width of the barge 12, for example, extending greater than one half of a width of the barge 12 measured perpendicular to the propulsion direction or greater than the width of the barge 12 measured perpendicular to the propulsion direction.

The left and right pipe sections 64 may each include an inner tube 70 having spaced apart, forward facing ports 68 allowing fluid flow from inside the pipe sections 64 to outside the pipe sections 64. The ports 68 may be rectangular in shape and may extend along a substantially straight line along the pipe sections 64. The ports 68 may be spaced apart and separated by gaps 71 defining horizontally separated nozzle segments 72.

Each of the nozzle segments 72 of the pipe sections 64 may be wrapped by a separate, concentric outer tube 74 or tubular sleeve which may be rotated with respect to the inner tube 70 and also having ports 76 and gaps 71 corresponding in area and shape to the ports 68 and gaps 71 of the inner tube 70. By rotating the outer tube 74 with respect to the inner tube 70, the ports 76 of the outer tube 74 may overlap with the walls of the inner tube 70 to create shutters varying the area of a shared opening 78 between the inner tube 70 and outer tube 74 and extending between an interior of the inner tube 70 and an outside the outer tube 74. For example, the port 76 of the outer tube 74 may be aligned with the port 68 of the inner tube 70 to allow for a maximum shared opening 78, and the port 76 of the outer tube 74 may overlap with the inner tube 70 to reduce the area of the shared opening 78. The rectangular shape of the ports allow for adjustment of the area of the shared opening 78 to be a linear relationship (direct relationship between shared opening area and length of overlap) therefore providing easier determination of area.

Figure 3:
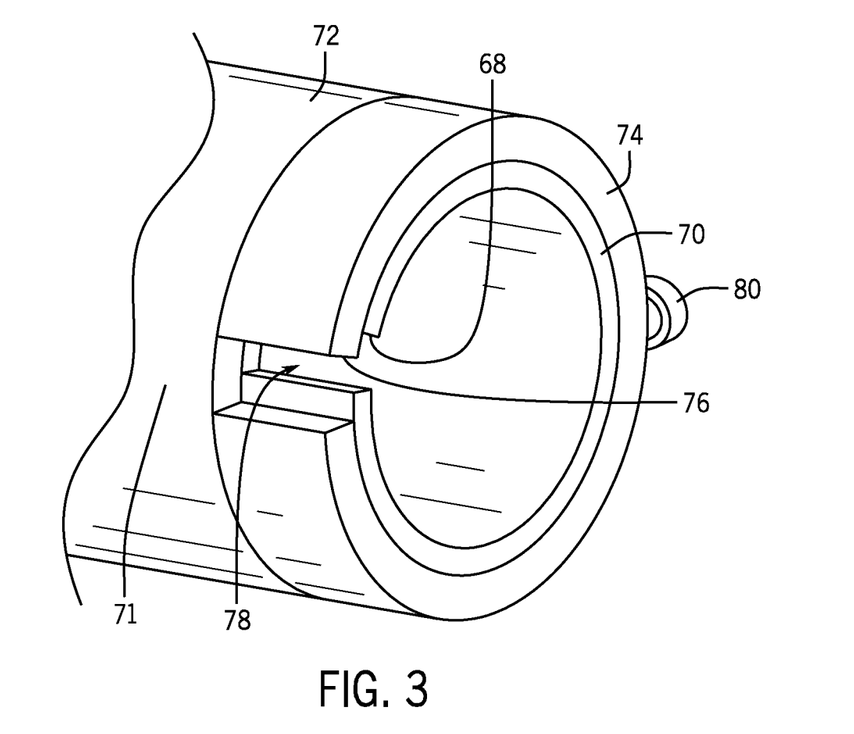
FIG. 3 is a cross-sectional view of a nozzle segment of the application nozzle whereby the orifice area is adjustable.

Once a desired shared opening 78 area is created, a set screw 80 may temporarily fix a position of the outer tube 74 with respect to the inner tube 70. It is contemplated that the shared opening 78 area may be easily adjusted by the user, however, the shared opening 78 area may also be permanently fixed once the optimal shared opening 78 area is determined.

The clamps 54 of the crossbar 60 may be installed between nozzle segments 72 and around the gaps 71 of the outer tube 74 and inner tube 70 so that the clamps 54 do not interfere with the shared opening 78 of the nozzle array 28.

Figure 4:
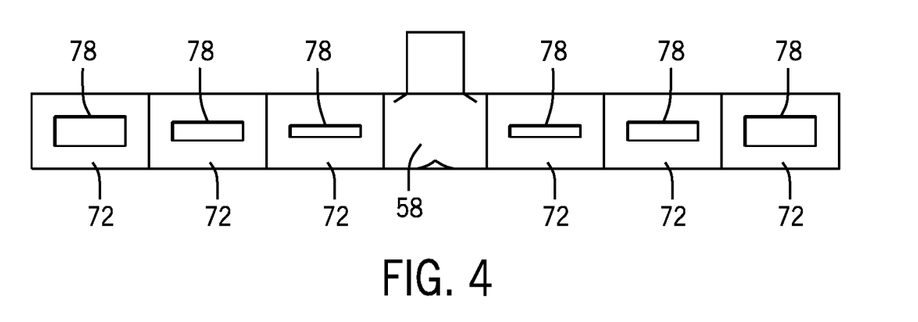
FIG. 4 is a schematic showing the orifice area of each nozzle segment of the application nozzle increasing in area as the liquid flows from the inlet.

Referring to FIG. 4, the opening 78 area of each nozzle segment 72 may be adjusted independently such that the shared opening 78 area and therefore fluid flow resistance may vary along a length of the nozzle array 28. In order to keep a constant flow rate or volume flow of the premixed molluscicide mixture 22 from the pipe sections 64 it may be desired to utilize shared opening 78 area that provides uniform delivery along an axis of the pipe sections 64. For example, the area of the openings 78 of the pipe sections 64 may be smallest toward a center of the pipe sections 64 where the premixed molluscicide mixture 22 is received by the pipe sections 64 and increase in area as one moves toward the outer ends of the pipe sections 64. In this respect, the natural delivery of greater amounts of premixed molluscicide mixture 22 toward a center of the pipe sections 64 will be re-distributed to the outer ends of the pipe sections 64 by reducing the shared opening 78 area toward the center and increasing the shared opening 78 area at the ends of the pipe sections 64.

The shared openings 78 may be positioned such that they are forward facing, rear facing, or downward facing, with respect to movement direction of the barge 12. In this respect the shared openings 78 may face a same direction as propulsion of the barge 12 or face an opposite direction as propulsion of the barge 12 or may be perpendicular to a propulsion of the barge 12.

The pipe sections 64 may have a circular cross-section facilitating the hydrodynamic movement of the pipe sections 64 through the water. In this respect the cross-section of the pipe sections 64 may have a low drag coefficient or a drag coefficient equal to or less than that of a circular cross-section (0.47 drag coefficient). The cross-section of the pipe sections 64 may alternatively be a half sphere (0.42 drag coefficient) or a streamlined body such as an airfoil (0.04 drag coefficient) to further reduce the drag coefficient.

It is understood that the inner tube 70 may have a 2.5 inch diameter and may be a schedule-40 pipe (however other diameters and materials are also viable). The inner tube 70 may be constructed of stainless steel. The outer tube 74 may be made of polyvinyl chloride cylindrical tubing or collars. The length of the pipe sections 64 may be approximately 9 to 12 feet.

Figure 6:
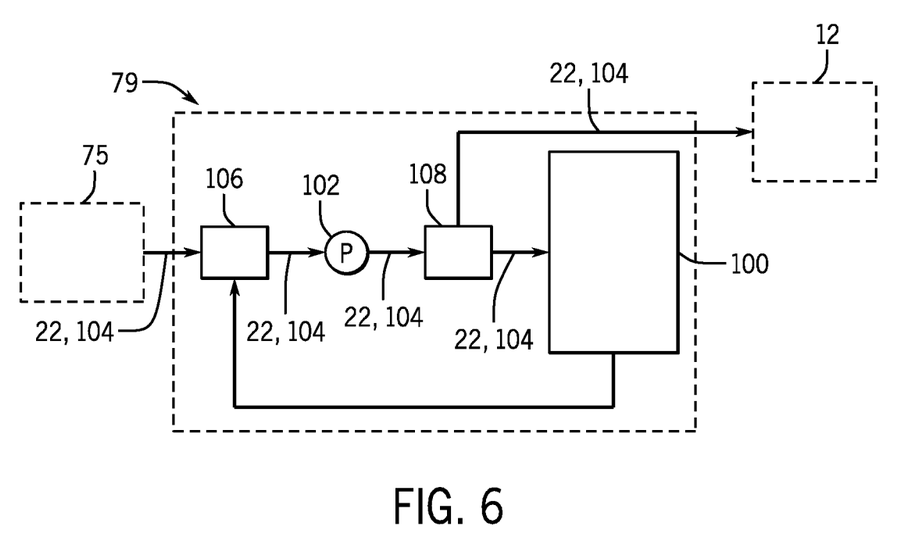
FIG. 6 is a block diagram showing the transport vessel apparatus.
Figure 7:
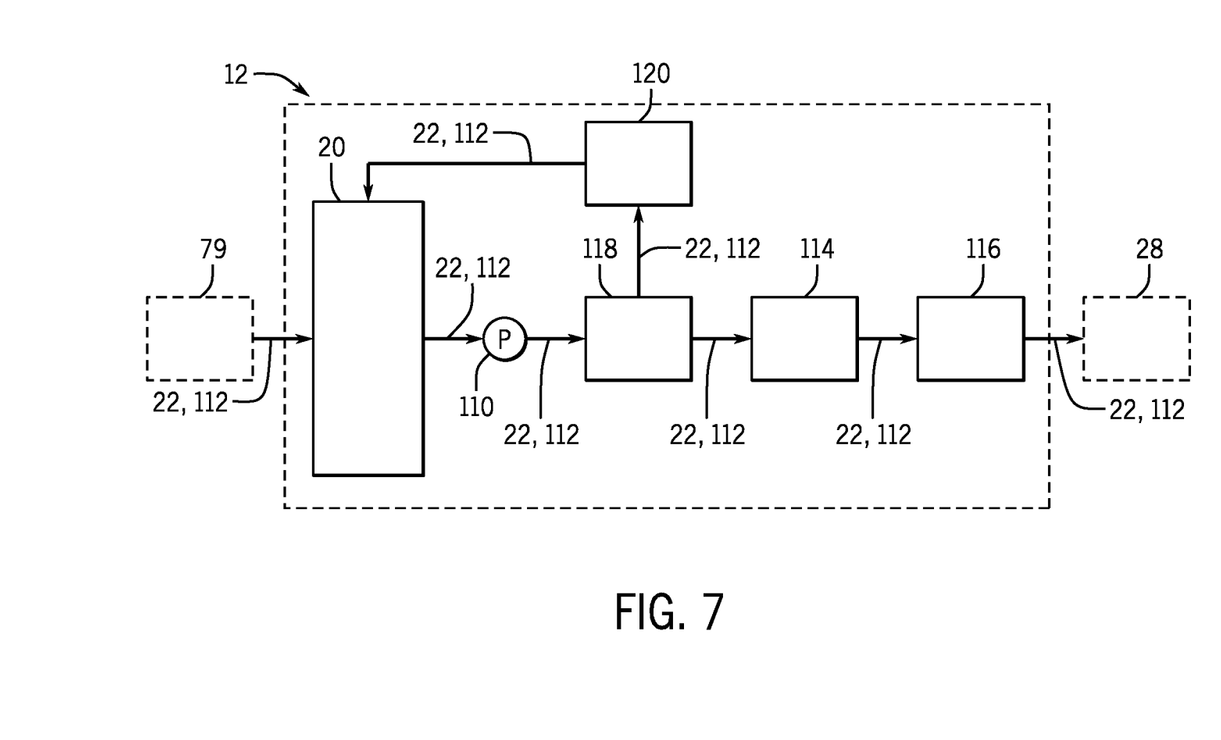
FIG. 7 is a block diagram showing the application vessel apparatus.

Referring to FIGS. 6 through 8, a process of applying the premixed molluscicide mixture 22 to the lakebed may include an onshore mixing assembly 75 followed by the transportation of the premixed molluscicide mixture 22 to a transport vessel 79 delivering the premixed molluscicide mixture 22 to the application barge 12 for final application of the premixed molluscicide mixture 22 to the targeted lakebed area.

Figure 5:
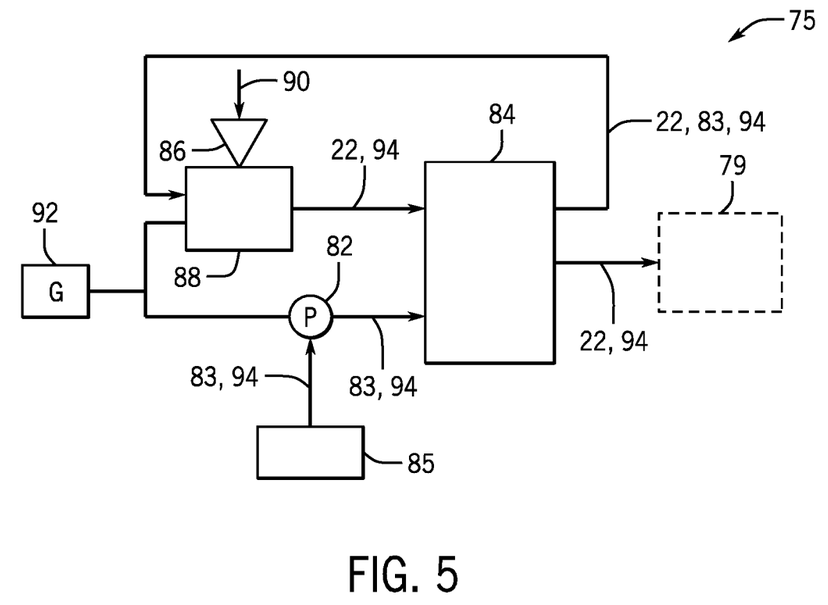
FIG. 5 is a block diagram showing the onshore mixing apparatus.

Referring to FIG. 5, the mixing materials used to produce the premixed molluscicide mixture 22 may be mixed onshore by the onshore mixing assembly 75 to reduce the risk of operating a high-voltage generator on open water. The onshore mixing assembly 75 may include a water inlet pump 82 drawing lake water 83 from a lake water source 85 into an onshore tote 84 to a desired water level. The water level within the onshore tote 84 may be determined by the lake water temperature, desired concentration and viscosity of the mixture, and/or total amount of applications to be applied. The onshore tote 84 may have a 275 gallon capacity and may provide a quick coupler fitting allowing for an easy connection of a hose system.

The water inlet pump 82 may be 250 W (⅓ horsepower) and may be self-priming up to 6.1 m (60 ft). The water inlet pump 82 may be capable of continuous pumping at a rate of 0.002 meters$^3$ per second (32 gpm).

A hopper 86 of a high shear mixer 88 may be filled with a defined amount of dry molluscicide material 90, for example, in the form of a wettable powder to create the desired concentration of molluscicide. A desired concentration of the dry molluscicide material 90 may be about 20% weight to volume (w/v) solution. The hopper 86 may include a funnel facilitating the flow of the powder downward into the mixer 88. A desired amount of dry material may be defined by the lake water temperature and/or total amount of applications to be delivered. The high shear mixer 88 may also draw the lake water 83 stored in the onshore tote 84 and mix it with the dry molluscicide material 90 before recirculating it back to the onshore tote 84.

The shear mixer 88 may include a rotor stater assembly which creates an intense sharing of the mixture and dissolves any clumps within the mixer 88. The shear mixer 88 can therefore mix materials with a single pass and minimizes the entrainment of air into the system. The recirculation of the mixed material through the shear mixer 88 further ensures that there is complete homogenization of the premixed molluscicide mixture 22 prior to application. It is understood that the mixer may be any type of mixer providing low air in entrainment.

The water inlet pump 82 and shear mixer 88 may be powered by an on shore generator 92. The generator 92 may be a 10 kW three-phase generator able to power the water inlet pump 82, for example, requiring 250 W of power, and the shear mixer 88, for example, requiring at least 2 kW of power.

It is understood that a network of pipes 94 may be used to transport the lake water 83 and the premixed molluscicide mixture 22 between the lake water source 85, water inlet pump 82, onshore tote 84, shear mixer 88, and transport vessel 79. Valves within the network of pipes 104 may control the flow of material through the network of pipes 104. It is understood that the pipes 94 may be a tube of flexible or rigid metal, plastic, or other material used to transport the solid or liquid material.

The mixing of the lake water 83 with the dry molluscicide material 90 continues until a homogenous air free premixed molluscicide mixture 22 is produced. The premixed molluscicide mixture 22 may then be delivered to the transport vessel 79 for delivery of the premixed molluscicide mixture 22 to the application barge 12, as further described below.

Referring to FIG. 6, the transport vessel 79 may support a transport tote 100 receiving the premixed molluscicide mixture 22 from the onshore mixing assembly 75. A trash pump 102 may then transfer the premixed molluscicide mixture 22 from the transport tote 100 to the application barge 12. The trash pump 102 may be able to handle a non-Newtonian fluid or the shear thickening properties of the premixed molluscicide mixture 22 while maintaining the desired flow rate of the mixture. It is desired that the trash pump 102 produce a high flow rate of premixed molluscicide mixture 22 to the application barge 12 to reduce the time lapse after mixing. The trash pump 110 may be able to pump 150 gallons per minute.

A network of pipes 104 may be used to transport the premixed molluscicide mixture 22 between the onshore mixing assembly 75, the trash pump 102, the transport tote 100, and the application barge 12. Valves within the network of pipes 104 may control the flow of material through the network of pipes 104. For example, a three-way valve 106 may control the flow of the premixed molluscicide mixture 22 either from the onshore mixing assembly 75 or the transport vessel 79, and a second three-way valve 108 may control the flow of the premixed molluscicide mixture 22 from the trash pump 102 either to the transport tote 100 or the application barge 12. It is understood that the pipes 104 may be a tube of flexible or rigid metal, plastic, or other material used to transport the solid or liquid material.

Referring to FIG. 7, the application barge 12, as previously seen in FIG. 1, may support a storage tank 20 receiving the premixed molluscicide mixture 22 from the transport vessel 79. A trash pump 110 may transfer the premixed molluscicide mixture 22 from the storage tank 20 to the nozzle array 28. The trash pump 110 may be able to pump 150 gallons per minute.

Optionally, a refrigerant or cooling element may be used to lower the temperature of the premixed molluscicide mixture 22 before delivery such that the premixed molluscicide mixture 22 has a lower temperature than the lake or river water resulting in the premixed molluscicide mixture 22 sinking to the river or lake bed upon leaving the nozzle array 28.

A network of pipes 112 may be used to transport the premixed molluscicide mixture 22 from the storage tank 20 to the nozzle array 28. Valves within the network of pipes 104 may control the flow of material through the network of pipes 104. For example, a three-way connector 118 and a control valve 120 may be used to control the flow of the premixed molluscicide mixture 22 either to the nozzle array 28 or back to the application barge 12 to be recirculated. It is understood that the pipes 112 may be a tube of flexible or rigid metal, plastic, or other material used to transport the solid or liquid material.

A control valve 114 and a flow sensor 116 may be used to control the flow rate of the premixed molluscicide mixture 22 to the nozzle array 28. The flow sensor 116 may be a variable area vein style flow sensor sensing a flow rate of the premixed molluscicide mixture 22 proximate to it leaving the nozzle array 28. The flow sensor 116 may alternatively be replaced by a positive displacement pump regulating an amount of premixed molluscicide mixture 22 exiting the nozzle array 28 or a pressure regulator regulating the force of the premixed molluscicide mixture 22 exiting the nozzle array 28.

It is understood that a velocity of the barge 12 with respect to the lakebed may be equal to the exit velocity of the premixed molluscicide mixture 22 so that there is a net zero velocity of the premixed molluscicide mixture 22 with respect to the lakebed. The net zero velocity reduces the turbulence of the premixed molluscicide mixture 22 and allows the premixed molluscicide mixture 22 to settle at the bottom of the lake without dispersing. The desired volume of premixed molluscicide mixture 22 may be an area of 3035 m² (0.75 acres) at a height of 0.75 m.

A fully automated control feedback system may use the flow rate monitored by the flow sensor 116 to adjust the flow rate up or down via the control valve 114 depending on an area of the shared opening 78, a boat velocity, a mass per unit area of the mixture application, lake water temperature, and/or desired concentration and viscosity of the mixture. The flow rate signal provides feedback that eliminates the need for precise monitoring of the operation of the trash pump 102.

EXAMPLE

A desired volume flow rate and/or area of the shared openings 78 of the nozzle array 28 may be determined as follows:

To maintain mixture viscosity, the concentration must change with water temperature. As concentration changes, the volume flow rate of the mixture pumped to the bottom of the lake must be adjusted to maintain a constant mass of Zequanox per given area. For a given total orifice area, $A_O$, average flow velocity of the mixture, $v_f$, changes proportionately with volume flow rate, Q, as can be seen in Equation 1.

$$Q = A_O * v_f \tag{1}$$

A treatment surface area, $A_t$, and treatment height, $h_t$, are used to calculate treatment volume, Vt (Eq. (2)).

$$V_t = A_t * h_t \tag{2}$$

The treatment surface area and treatment height were specified to be 3,035 m² (0.75 acres) and 0.75 m, respectively. The resulting treatment volume was 2,276 m³.

The treatment volume was assumed to be a homogenous mixture of Zequanox and water. The total mass of Zequanox, $m_Z$, is the product of the treatment volume and treatment concentration, $C_t$ (Eq. (3)).

$$m_z = v_t * C_t \tag{3}$$

The lethal concentration was specified as 100 milligrams per liter. Zequanox is 50% active ingredient, meaning the lethal concentration is 200 mg of Zequanox powder per liter of water. The total mass of Zequanox was calculated, using Equation 3, to be 455.3 kg. Note that the mass was dependent only on the treatment volume and lethal concentration, not application concentration.

To maintain the optimal application viscosity of 180 cSt, the application concentration, $C_a$, had to vary with water temperature, $T_w$. Equation 4 was determined experimentally to model concentration (Eq. (4)).

$$C_a = e^{((T_w + 40.44)/22.34)} \tag{4}$$

For calculation and illustration purposes, the temperature range was set to achieve application concentrations from approximately 100 to 300 grams per liter. This concentration range is held at a constant viscosity of 180 cSt in equations 4 through 11.

The density of Zequanox was determined by first zeroing a scale with an empty 50 mL beaker and then by measuring 10 mL of Zequanox and weighing it on a scale. The density of Zequanox was then calculated as the quotient of the mass of Zequanox, $m_Z,1$, and the volume of Zequanox, $V_{Z,1}$ (Eq. (5)).

$$\rho_z = m_{z,1}/V_{z,1} \tag{5}$$

The density of Zequanox was 585.2 kilograms per meter³.

The volume of water required for application, $V_w$, is the quotient of the mass of Zequanox and application concentration (Eq. (6)).

$$V_w = m_z/c_a \tag{6}$$

The total volume of Zequanox required for application, $V_Z$, is the quotient of the mass of Zequanox and the density of Zequanox, $\rho_z$ (Eq. (7)).

$$V_Z = m_z/\rho_z \qquad (7)$$

Therefore, the volume of Zequanox for the calculated 455.3 kg of Zequanox was 0.778 m³.

The total volume to be applied, $V_{tot}$, is the sum of the volume of water and the volume of Zequanox (Eq. (8)).

$$V_{tot} = V_w + V_z \qquad (8)$$

Boat velocity, $v_b$, has been set constant to 0.447 meters per second (1 mph). This boat velocity was selected to reduce the corresponding volume flow rate to a point where it could be achieved with readily available components. Application time, t, is a function of treatment surface area, injection array width, $w_n$, and boat velocity, $v_b$ (Eq. (9)).

$$t = A_t/(w_n * v_b) \qquad (9)$$

The injection array width was set to 3.66 m (12 ft). This value was chosen as a compromise between total application time, boat maneuverability, and pump limitations. The application time was calculated to be 5,431.5 seconds (1.51 hours).

Volume flow rate, Q, is the quotient of the total volume and application time (Eq. (10)).

$$Q = V_{to}/t \qquad (10)$$

Equation 1 was rearranged to allow for total orifice area to be solved (Eq. (11)).

$$A_0 = Q/v_f \qquad (11)$$

The volume flow rate and application concentration are directly proportional. Thus, the total orifice area is a function of application concentration.

It is understood that the present invention may be scaled up to allow for use with larger aquatic vessels and treatment in larger bodies of water such as large lakes and oceans.

It is also understood that the present invention may be used to treat other aquatic invasive species such as Asian carp, round goby, lionfish, water milfoil, etc. in a similar manner.

The term "application" refers to the moment of injection of the premixed molluscicide mixture 22 from the nozzle array 28.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. An invasive species toxin application system comprising:
   a boat including a propulsion system for moving the boat along a surface of a body of water in a propulsion direction as directed by a steering wheel;
   a tank supported by the boat for holding a toxin;
   a nozzle extending perpendicular to the propulsion direction;
   nozzle supports extending downward from the boat to hold the nozzle beneath the surface of the body of water at a predetermined depth; and
   a pump for delivering the toxin from the tank to the nozzle at a predetermined delivery rate;
   wherein the nozzle provides at least one laterally extending opening presenting a variable fluid flow resistance as a function of lateral distance to promote uniform flow rate as a function of lateral distance.

2. The system of claim 1 wherein the laterally extending opening is a set of discrete slots of varying area.

3. The system of claim 2 wherein the set of discrete slots increase in area as the slots move away from an inlet of the nozzle.

4. The system of claim 1 wherein the nozzle extends by a lateral distance at least one half of a width of the boat measured perpendicularly to the propulsion direction.

5. The system of claim 4 wherein the nozzle extends a bilateral distance greater than the width of the boat.

6. The system of claim 1 wherein the nozzle is positioned beneath the surface of the water by at least four feet.

7. The system of claim 1 wherein the nozzle provides a laterally extending tube connected by a T fitting to a vertically extending toxin delivery pipe communicating with the pump.

8. The system of claim 1 wherein the opening is positioned to face rearward with respect to the propulsion direction.

9. The system of claim 1 wherein the nozzle has a drag coefficient less than or equal to a drag coefficient of a circle.

10. The system of claim 9 wherein the nozzle has a circular cross-section.

11. The system of claim 1 further comprising a height control mechanism supporting the nozzle and adjustable to position the nozzle beneath the surface of the water at varying depths.

12. The system of claim 11 wherein the nozzle provides a laterally extending tube connected to a vertically extending toxin delivery pipe communicating with the pump wherein the vertically extending toxin delivery pipe is a flexible hose.

13. The system of claim 11 wherein the height control mechanism is at least two laterally offset supports extendable below the surface of the water and supporting opposite ends of the nozzle and mechanically linked to move in unison.

14. The system of claim 1 wherein an area of the laterally extending opening is adjustable.

15. The system of claim 14 wherein the laterally extending opening is a rectangular shutter providing adjustability of area with opening or closing of the shutter with a relationship of direct proportionality between area and an amount of opening or closing of the shutter.

16. The system of claim 1 further comprising a flow rate sensor providing a flow rate of the toxin exiting the nozzle.

17. The system of claim 16 further comprising a control system controlling the flow rate of the toxin to be substantially equal to a speed of the boat.

18. A method of delivering invasive species toxin to a body of water, the method comprising:

using a low air entrainment mixer to mix a wettable solid with water without substantial entrainment of air to produce a toxin;

delivering the toxin mixed by the low air entrainment mixture to a tank of a boat including a propulsion system for moving the boat along a surface of a body of water in a propulsion direction as directed by a steering wheel;

moving the boat along the surface of the body of water in the propulsion direction to a location of an invasive species; and pumping the toxin from the tank to a nozzle extending laterally across the propulsion direction at a predetermined delivery rate, the nozzle supported by nozzle supports extending downward from the boat to hold the nozzle beneath the surface of the body of water at a predetermined distance;

wherein the nozzle provides at least one laterally extending opening presenting a variable fluid flow resistance as a function of lateral distance to promote uniform flow rate as a function of lateral distance.

19. The method of claim 18 further comprising chilling the toxin prior to delivering the toxin through the nozzle.

* * * * *